May 21, 1929.　　　　C. R. LITTLE　　　　1,713,611
GAITER FOR SUSPENSION SPRINGS
Filed April 18, 1925　　　2 Sheets-Sheet 1
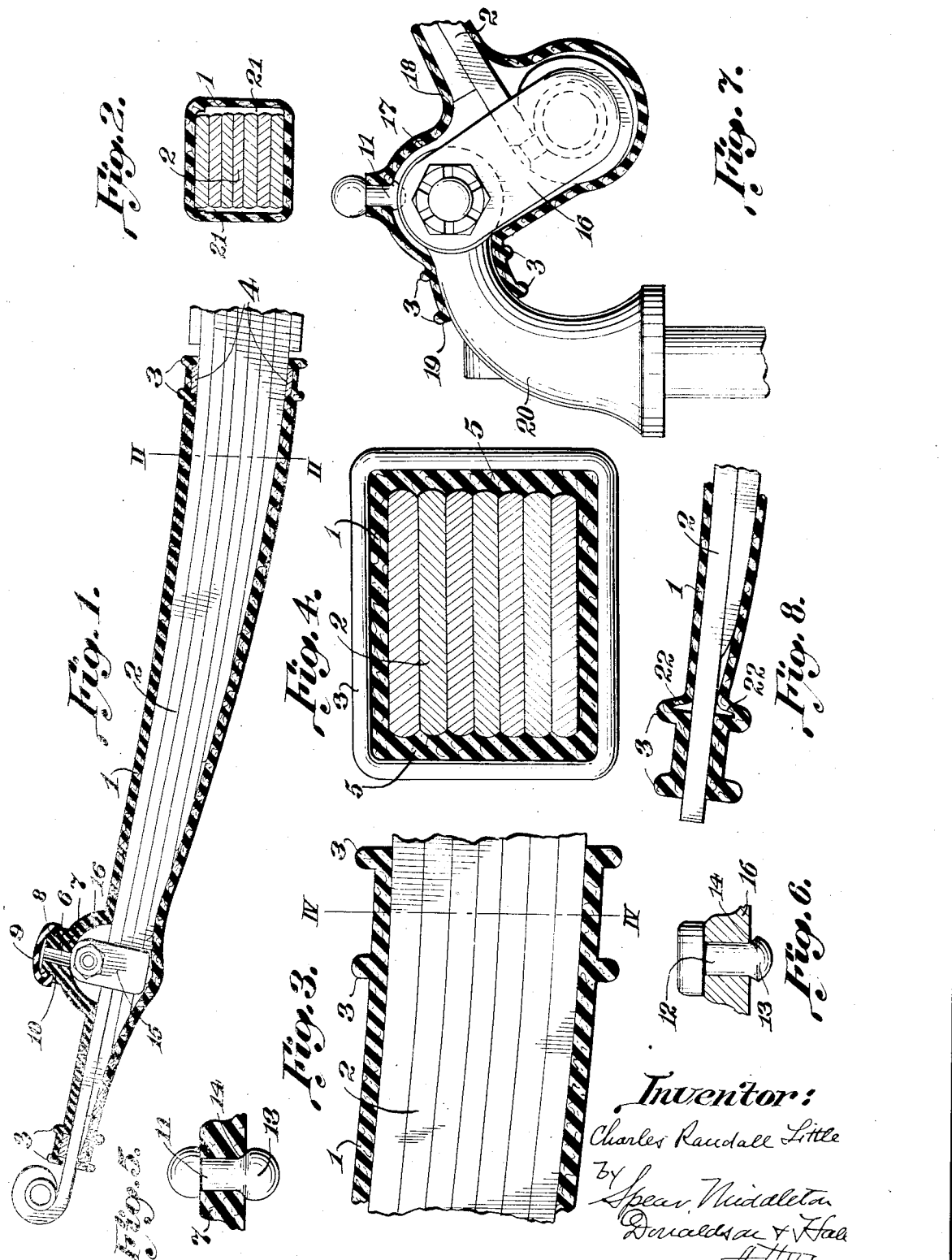

May 21, 1929.　　　　　C. R. LITTLE　　　　　1,713,611
GAITER FOR SUSPENSION SPRINGS
Filed April 18, 1925　　　2 Sheets-Sheet 2

INVENTOR:
CHARLES R. LITTLE
by Spear, Middleton, Donaldson Hall
Attys.

Patented May 21, 1929. 1,713,611

UNITED STATES PATENT OFFICE.

CHARLES RANDALL LITTLE, OF COVENTRY, ENGLAND, ASSIGNOR TO HERBERT LORD, OF EARLSDON, ENGLAND.

GAITER FOR SUSPENSION SPRINGS.

Application filed April 18, 1925, Serial No. 24,191, and in Great Britain April 28, 1924.

This invention relates to gaiters for suspension springs and shackles, and it has for its object to provide a neat and easy fitting device which will be of a durable nature adapted effectively to protect the spring from dirt and moisture and to provide for its thorough lubrication.

According to this invention, the gaiter is formed as a jointless sleeve of material such as rubber (or rubber which is wholly or partly reinforced by fabric) which fits closely on to and is carried solely by the spring.

The sleeve can be drawn lengthwise on to the spring, and its end parts are adapted to be secured pressure-tight to the spring. Thus an elastic sleeve of this kind is adapted to contain lubricant under pressure between its walls and the spring, with the advantage that during the working of the spring under load lubricant is continually being forced in between the leaves, whereas as usually arranged, such lubricant as is placed between the springs on assembly is continually being squeezed out.

A sleeve of this kind can be fitted to any spring, and among other advantages it supports the spring and tends to damp any excess movement thereof.

In the accompanying drawings, which illustrate various methods of carrying out the invention, Figure 1 is a side elevation of a spring (which might be either a cantilever or part of a semi-elliptic spring) showing one form of the gaiter in position and in longitudinal section.

Figure 2 is a section on the line II, II of Figure 1.

Figure 3 is a fragmentary view of a slightly modified construction of that shown at the right hand end of Figure 1.

Figure 4 is a cross section on the line IV, IV of Figure 3.

Figures 5 and 6 are alternative forms of stoppers for the lubrication apertures in the gaiter.

Figure 7 is a section of an auxiliary gaiter employed to enclose the spring shackle.

Figure 8 shows a modified construction of the left hand end of the gaiter shown in Figure 1.

Figure 9:
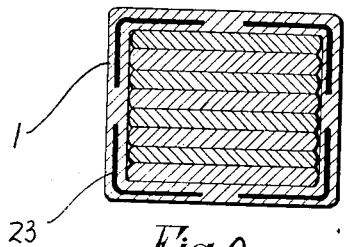
Figure 9 is a sectional view of a gaiter and spring having longitudinal divisions in the enclosed fabric.

In a preferred method of carrying out the invention, the gaiter is a seamless sleeve 1 of rubber reinforced with fabric in such a manner as to allow a certain amount of elasticity in its walls to accommodate itself within limits to springs 2 of different sizes. Such elasticity may be obtained by the provision of longitudinal corrugations in the fabric or by one or more longitudinal divisions in the fabric.

The ends of the sleeve are preferably provided with flanges 3 by means of which, in certain cases, they can be clipped, bound, or bolted to suitable parts, either existing or provided for the purpose, so as to render the ends of the gaiter fluid-tight.

Preferably, however, a pair of flanges 3 is provided at each end, and between them is located contractile means, such as a strap, metal clip, or a band of adhesive tape wound tightly round several times to cause the gaiter to grip the spring pressure-tight.

To assist in making this pressure-tight connection, a channel 4 may be formed around the interior of the gaiter at the position between the flanges 3, and in this may be located absorbent material, such as felt. Alternatively, instead of the groove, the sides of the gaiter may be so shaped as to agree with the scalloped contour of the spring arising from the rounding of the edges of its several leaves. Thus when the gaiter is compressed at this position around the spring,—a good pressure-tight joint results. This is illustrated in Figures 3 and 4, the latter showing a rib 5 scalloped at the sides where it bears on the rounded edges of the leaves. This rib may be integral with, or separate from the body of the gaiter, in the form of a ribbed sleeve.

An aperture 6, or apertures, may be provided along the upper side of the gaiter for introduction of lubricant therein. Preferably the aperture is provided with a neck 7 having a flange 8 at its end which can be engaged by a resilient closure cap 9 having a lip 10 to engage the flange. If pressure supply of lubricant is not desired an air vent may be provided in each cap.

Alternative closure devices may be in the form of stoppers 11 and 12 (Figures 5 and 6), formed of rubber, wood, or other material, with enlargements 13 at their inner ends forming a sealing device against internal pressure and seating on rounded edges 14 at the inner ends of the apertures 6.

The wall of the gaiter may have a channel formed in the inner side of the upper part, so that when the latter is in contact with the upper leaf of the spring a conduit is provided from end to end for the lubricant, and the previously mentioned apertures may be formed to communicate with this channel. It may be here pointed out that the presence of this channel would impart a certain amount of elasticity to the walls of the gaiter as above mentioned. Any necessary or desirable auxiliary grooves may be provided in other parts of the wall of the gaiter to ensure an effective distribution of the lubricant and the displacement of the air when the lubricant is introduced. Also, where the spring is provided with a clip such as 15, or clips intermediate of its ends, the gaiter may be reinforced where it engages, or, as shown in Figure 1, it may have a suitable enlargement 16 to enclose the clip.

A gaiter as above described can readily be applied to the spring, as it is only necessary to disconnect the shackle pin at the end thereof and to draw the gaiter longitudinally along the spring and to attach its ends in the manner above described. Obviously the securing devices at the end could be modified in various ways as to their form and manner of fixing provided they were adapted effectively to prevent loss of lubricant or entry of dirt or moisture.

A suitable provision could be made in the gaiter, or an auxiliary part, for enclosing the shackle pin or pins also. For example, as shown in Figure 7, where the spring 2 connects with the shackle 16' an auxiliary gaiter 17 is provided, one end 18 of which engages the spring 2, while the other end 19 engages the bracket 20 to which the shackle is attached. The other end 19 of the auxiliary gaiter may be provided with flanges 3 so that it may be clipped pressure-tight to the bracket, as described for the ends of the main gaiter.

To provide a more effective distribution of the lubricant to the several leaves of the spring and to prevent the lower portions receiving all the lubricant at the expense of the upper ones, the gaiter normally may have walls, the sides of which are concave or taper in the vertical direction so that a V-shaped space is provided along the spring and extending down to about the middle of the latter, the upper part of this V-shape being widest. Thus lubricant is chiefly retained at the upper part of the gaiter so that the upper leaves receive the full share of lubricant. As an alternative to this, the sides of the gaiter may be substantially parallel with the sides of the spring, having, for example, about one thirty-second of an inch clearance therefrom. Such clearance, considerably exaggerated for clearness, is shown at 21 in Figure 2.

A further alternative construction is shown in Figure 8, in which, to provide longitudinal freedom of the gaiter between the ends which are anchored securely, a transverse fold 22 or corrugation is provided at one or more places in the gaiter, for example, at the end near to the shackle. Thus when, through flexure of the spring under load, there would otherwise be a tendency of the ends of the gaiter to slip slightly along the spring, the fold or corrugation will yield and prevent any strain upon the pressure-tight ends.

Figure 10:
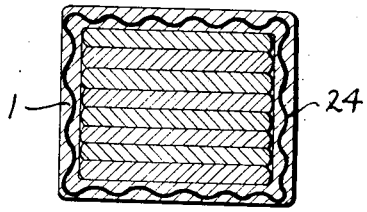
Figure 10 is a similar view showing corrugations in the fabric.

In the modification shown in Figs. 9 and 10, the gaiter is provided with fabric embedded in the rubber material. In Fig. 9, this fabric is shown at 23 having longitudinal divisions therein. Fig. 10 shows the fabric as having corrugations 24. Both of these forms tend to increase the flexibility of the device.

Figure 11:
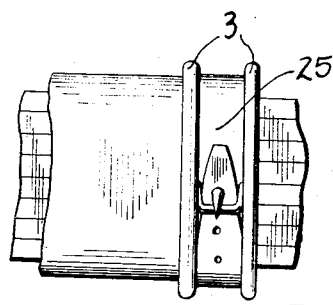
Figure 11 is a fragmentary side elevation showing a strap used to retain the gaiter in place.
Figure 12:
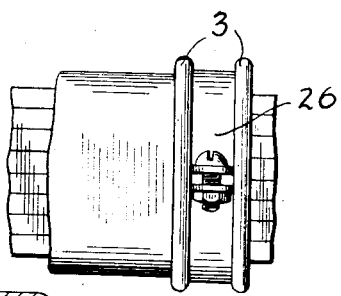
Figure 12 is a similar view showing the use of a metal clip.
Figure 13:
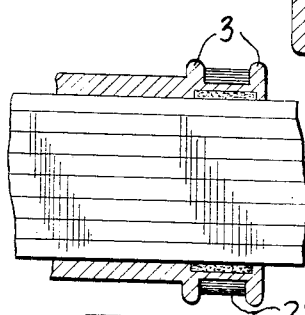
Figure 13 is a similar view with several windings of adhesive tape as a retaining element.

In Fig. 11, a strap 25 is held between ribs 3, in Fig. 12, a metal clip 26 is similarly located and in Fig. 13, several convolutions of adhesive tape 27 is provided for the purpose of assisting in retaining the device in place.

Figure 14:
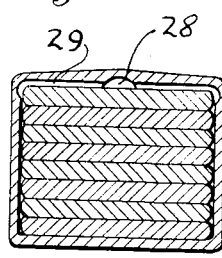
Figure 14 is a sectional view showing lubricant channels.

Fig. 14 shows a longitudinal lubricant channel at 28 and a space 29 which assists in distributing the lubricant to all the enclosed parts.

Figure 16:
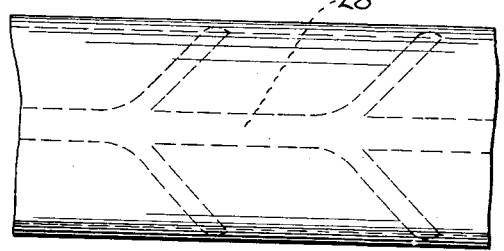
Figure 16 is a top phantom view showing the lubricant channels.

Fig. 16 shows this channel 28 to be of a tree type.

Figure 15:
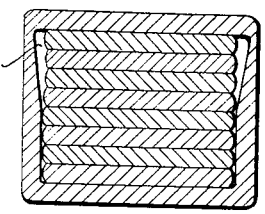
Figure 15 is a similar view showing modified channels.
Figure 17:
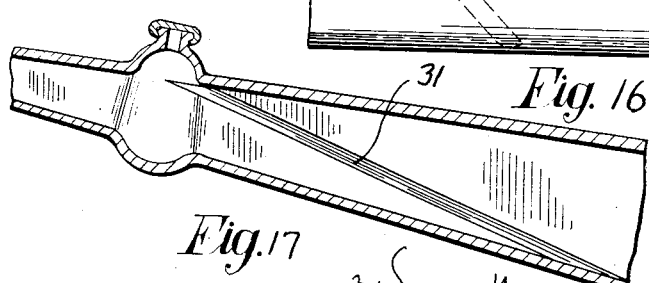
Figure 17 is a sectional elevation showing a side lubricant channel.

A channel 30 and groove 31 as shown in Figs. 15 and 17 allows the lubricant to flow from top to bottom of the device.

The lubricant employed is preferably one which has no injurious action upon rubber.

From the foregoing it will be seen that the invention provides a very simple and relatively inexpensive kind of gaiter and one that is easy to fit, efficient in use, and capable of prolonged service without deterioration.

It has previously been proposed to form a gaiter of sheet metal of rectangular section which was supported solely by the spring but obviously such a gaiter could not bend with the spring, whereas the gaiter which is the subject of the present invention is flexible to the highest degree and in no way affects the bending of the spring.

Other gaiters have also been proposed formed of seamless flexible material, but in neither case were they supported wholly by the spring, as their ends engaged with and were supported by casings which enclosed the shackle pins. Such gaiters could not be assembled on the spring prior to fitting to the vehicle.

What I claim as my invention and desire to secure by Letters Patent of the United States is:—

1. A flexible gaiter for parts to be lubricated formed as a jointless sleeve of rubber material which fits closely on to and is carried solely by the parts to be lubricated, the ends of the gaiter being attached to the parts to be lubricated.

2. A flexible gaiter for a suspension spring formed as a jointless sleeve of material of an elastic nature which fits closely around the spring and is adapted to contain lubricant under pressure between its walls and the spring the ends of the gaiter being attached to the parts to be lubricated.

3. A flexible gaiter as claimed in claim 1, in which the end parts thereof are adapted to be secured pressure-tight to the parts to be lubricated, substantially as and for the purpose described.

4. A flexible gaiter as claimed in claim 1, provided with an integrally formed lubrication device, substantially as and for the purpose described.

5. A flexible gaiter as claimed in claim 1, provided with an integrally formed hollow neck for the introduction of lubricant adapted to be sealed by a pressure resisting detachable stopper or cap, substantially as and for the purpose described.

6. A flexible gaiter as claimed in claim 1, the wall of which is channelled to enable lubricant to be distributed from the filling aperture throughout its length, substantially as and for the purpose described.

7. A flexible spring covering comprising a substantially frusto-conical element of less diameter than the diameter at a similar point of the spring to which it is to be applied.

8. A spring covering comprising a substantially frusto-conical elastic element and reinforcing peripheral ribs at each end thereof.

9. A lubricant holder comprising an elastic casing conforming substantially to the outline of the part to be lubricated, and having a reinforcing rib at one end thereof to prevent the escape of lubricant therefrom.

10. A lubricant holder comprising an elastic casing having open ends, through which the ends of the parts to be lubricated project, and means surrounding the open ends of said casing tending to grip the parts to be lubricated to a greater degree than the main portion of the casing, whereby escape of the lubricant out of the ends of the casing is prevented.

11. A lubricant holder comprising an elastic casing snugly fitting the part to be lubricated and of such a diameter that the sum of the diameter of the part to be lubricated plus the lubricant will distend or stretch the elastic casing, whereby the lubricant is forced onto the parts to be lubricated.

12. A cover for a vehicle spring, comprising an oil proof, flexible, moulded rubber tube adapted to be slipped over the spring.

13. A jointless rubber gaiter for a suspension spring which from end to end grips the spring and is adapted to contain lubricant under pressure.

In testimony whereof I have signed my name to this specification.

CHARLES RANDALL LITTLE.